United States Patent Office 3,396,865
Patented Aug. 13, 1968

3,396,865
SYNTHESIS PRESSURE VESSEL
Albert Walter Elmes and Martin John Montague Raymond, Norton-on-Tees, England, assignors to Imperial Chemical Industries Limited, London, England, a corporation of Great Britain
Filed Apr. 1, 1965, Ser. No. 444,772
Claims priority, application Great Britain, Apr. 8, 1964, 14,540/64
1 Claim. (Cl. 220—13)

ABSTRACT OF THE DISCLOSURE

A pressure vessel suitable for synthesis of e.g. ammonia or methanol has a thermally conducting pressure shell, a chemically resistant thermally insulating lining within the shell and means for cooling the pressure shell. The pressure shell can be made of steel, the lining of dense refractory concrete and cooling is preferably by means of a circulating fluid within the water jacket.

---

Figure 1:
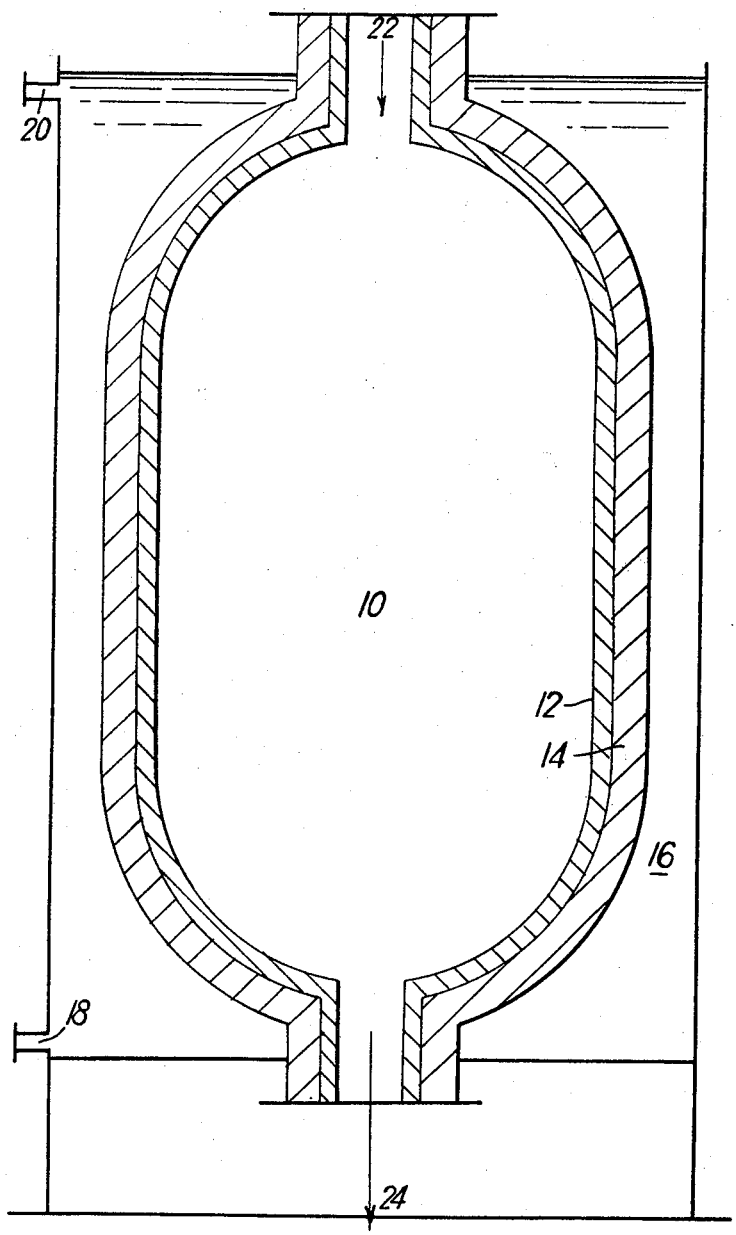

This invention relates to a synthesis pressure vessel provided with means to safeguard its walls from excessive temperatures.

According to the invention there is provided a synthesis pressure vessel having a thermally conductive pressure shell, a chemically resistant thermally insulating lining within the shell and means for cooling the pressure shell.

The synthesis pressure vessel is especially for use in carrying out chemical synthesis processes at moderate to high temperatures, for example 150 to 600° C. and at high pressures for example 50 to 500 atmospheres gauge. It is especially useful for processes such as ammonia synthesis or methanol synthesis in which the reactants, hydrogen and nitrogen or carbon oxides, cause embrittlement or wastage of metals at the pressure and temperatures normally used. Although in order to avoid such embrittlement or wastage there have been previously proposed synthesis pressure vessels in which the gases in contact with the inner surface of the pressure shell are cold, for example are reactant gases before they have been warmed by heat exchange with product gases, such vessels are complicated and costly, by comparison with the vessel according to the invention.

The thermally conducting pressure shell may be made for example of steel especially ferritic steel which may contain minor amounts of alloying elements, for example chromium. The chemically resistant thermally insulating lining is preferably a dense refractory concrete rather than an insulating concrete. A suitable hydraulic cement-aggregate composition is aluminous cement with calcined kaolin. The lining may if desired contain reinforcing members. In accordance with normal practice in making refractory linings, the adhesion of the lining can be assisted by anchoring members fixed to the pressure shell. The chemically resistant thermally insulating lining within the pressure shell may comprise pre-formed units but is preferably cast in place from for example a wet mix. Many refractory concretes can be used: they should of course be chosen according to the nature of the chemical substances with which they are to come into contact during the use of the pressure vessel. Thus impurities such as sulphur or carbonate which would give rise to catalyst poisons, or iron oxides, which would undergo reduction by synthesis gas constituents, should be substantially absent. The lining may if desired carry a surface layer of a material more capable of withstanding abrasion by catalyst particles than the main insulating material. By the use of the vessel according to the invention it becomes possible to avoid the difficulty of fabrication and the risks of failure and leakage which arise when a complete further lining, for example, a metal sheath, is provided inside the insulating lining.

Although the insulating lining decreases considerably the transfer of heat from the reaction mixture to the pressure shell, it is desirable to provide also means for cooling the pressure shell. Such cooling limits the extent to which the shell can become heated as a result of conduction of heat through the lining or of accidental leakage of hot gas through or outside the lining. It thus also limits the expansion of the shell, thus increasing the effectiveness with which it supports the insulating lining and preventing the formation of a space between the layer and the shell, through which hot gas could by-pass the catalyst bed. Preferably this cooling is effected by enclosing the pressure shell in a jacket and arranging for circulation of a cooling fluid through the jacket. Suitable fluids are carbon dioxide gas, water, oil and heat transfer media such as a diphenyl-diphenyl ether mixture, for example that sold under the registered trademark "Thermex." Preferably this cooling is sufficient to keep the external shell temperature at the most a little above 100° C. If water is used, suitable precautions should be taken to inhibit corrosion and fouling of the outside of the pressure shell: thus in a particularly preferred form of the invention the synthesis pressure vessel is cooled by water treated to prevent corrosion fouling, for example boiler feed water.

The synthesis pressure vessel according to the invention is especially advantageous when its catalyst volume is 15 cubic metres or more, for example 30 to 60 cubic metres. Such large vessels are required especially for plants to be operated at pressures in the lower range practically usable for ammonia manufacture, for example 100 to 200 atmospheres, or for methanol manufacture, for example 30 to 120 atmospheres. It will be appreciated that internal heat-exchanger arrangements for keeping the internal walls of such vessels cool must be costly, especially if they necessitate a full-bore vessel closure.

One preferred form of the invention, usable as a converter for ammonia synthesis, is shown in axial section in FIGURE 1 of the accompanying drawing. Here the interior 10 of the vessel is packed with particulate catalyst (not shown) and contains also means for temperature control; apart from the temperature control means the catalyst fills the vessel and is in contact with the thermally insulating lining 12, which is made of insulating or dense refractory concrete based on aluminous cement sold under the registered trademark "Secar." This lining was cast in place from a wet mix. The pressure shell 14 is made of low-chromium ferritic steel. The outer jacket 16 contains boiler feed water which is circulated in at 18 and out at 20. The reactant gases are passed into the vessel at 22 and leave at 24.

Figure 2:
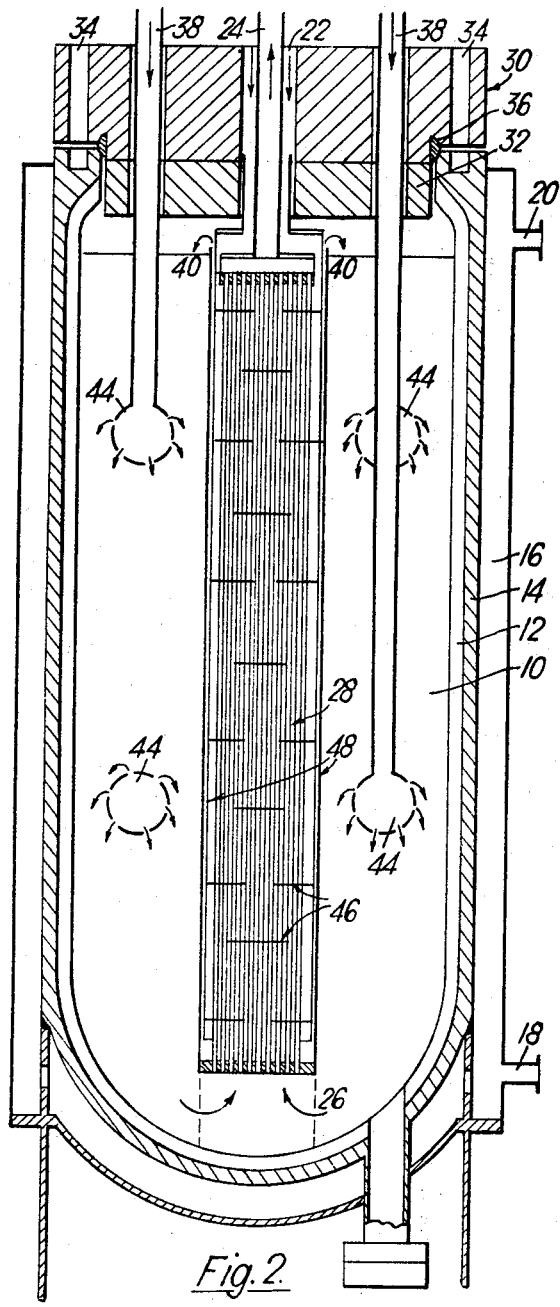

A second preferred form of the invention, also usable as a converter for ammonia synthesis, is shown in axial section in FIGURE 2 of the accompanying drawings. This converter employs an axial heat exchanger and quench means for temperature control. The main part 10 of the vessel interior is packed with particulate catalyst (not shown), which fills the axial-section space between the 3 inch-thick insulating lining 12 and the tube 26 surrounding the axial heat exchanger 28. The lining is made of refractory concrete consisting of the aluminous cement sold under the registered trademark "Secar" with calcined kaolin as aggregate. This lining was cast in place from a wet mix and is anchored to the pressure shell by V-shaped anchors (not shown). The pressure shell 14 is again made of a low-chromium ferritic steel and is enclosed in the outer jacket 16 which contains boiler feed water circulated in at 18 and out at 20. The vessel lid 30, which is not a full-bore closure, carries on its inner side a protective block 32 of refractory concrete. The lid is held in position by studs at 34 and a seal is maintained at 36. The lid is formed with a central aperture for the coaxial gas entry and exit mains, and with apertures 38 for the quench gas entry pipes 40. The quench gas is fed by way of spargers 44. The upper sparger is C-shaped, the lower one annular.

The arrows show the direction of gas flow in the vessel according to FIGURE 2. Cool or warm gas enters by the outer coaxial central main 22 and passes down on the shell side of the heat exchanger 28 guided by baffles 46. It then passes up through the annular section surrounding the heat exchanger and enters the top of the catalyst bed. As the gas passes down through the catalyst, reaction takes place and the temperature rises but is controlled by mixing with cool or warm gas admitted through spargers 44. The gas finally passes up through the tube side of the heat exchanger 28, where it gives up heat to the incoming cool gas, and then leaves by the inner coaxial central main 24.

During the operation of the process of ammonia synthesis the vessel according to FIGURE 1 or FIGURE 2 is typically filled with the gaseous reaction mixture at a pressure of 100–300 atmospheres gauge. The temperature of the reactants entering the catalyst bed is typically 380–450° C., that of the products after heat exchange is typically 200° C. The quench gas may be cool, that is, below 100° C., for example 15°–30° C., or warm, that is above 100° C., for example 150° to 250° C. Using an insulating lining 3 inches thick the temperature at the inner surface of the pressure shell is typically 120° C. Using a convenient rate of circulation of boiler feed water temperature at the external surface of the pressure shell is typically 100° C. At such temperatures the pressure shell is substantially immune to embrittlement by such reactant gases as come into contact with it.

What is claimed is:
1. A pressure vessel for carrying out synthesis reactions at pressures in excess of 30 atmospheres, comprising:
   a thermally conductive pressure shell having sufficient strength to support and confine a refractory inner lining within said pressure shell,
   a one-piece refractory inner lining of cast dense refractory concrete exposed to a reaction zone of said vessel and in intimate contact with an inner surface of said pressure shell, said refractory lining being thermally insulating and resistant to synthesis gases and reactants encountered in the synthesis of ammonia or methanol, said refractory lining further being entirely supported and strengthened by said pressure shell to withstand all pressures anticipated in the synthesis of ammonia or methanol, and
   a cooling jacket means for enclosing substantially all of said pressure shell and its contained refractory lining, said cooling jacket means having means for receiving and circulating a fluid for cooling the pressure shell and for maintaining the pressure shell in intimate, supporting relationship to said refractory lining.

References Cited

UNITED STATES PATENTS

| | | | |
|---|---|---|---|
| 1,286,135 | 11/1918 | Somermeier | 23—289 |
| 1,924,832 | 8/1933 | Brandt | 220—63 |
| 2,028,968 | 1/1936 | Carlstrom | 220—63 |
| 2,357,727 | 9/1944 | Craig | 220—13 |
| 2,545,384 | 3/1951 | Rehrig | 220—13 |
| 2,833,631 | 5/1958 | Rossheim et al. | 220—63 |
| 2,896,416 | 7/1959 | Henry | 220—13 |
| 3,008,811 | 11/1961 | Brumbough et al. | 23—289 |
| 1,426,920 | 8/1922 | Sleeper | 220—3 |

THERON E. CONDON, *Primary Examiner.*

J. R. GARRETT, *Assistant Examiner.*